(12) United States Patent
Mehta

(10) Patent No.: US 7,489,531 B2
(45) Date of Patent: Feb. 10, 2009

(54) INVERTER WITH IMPROVED OVERCURRENT PROTECTION CIRCUIT, AND POWER SUPPLY AND ELECTRONIC BALLAST THEREFOR

(75) Inventor: Bhadresh Mehta, Bartlett, IL (US)

(73) Assignee: Osram Sylvania, Inc., Danvers, MA (US)

( * ) Notice: Subject to any disclaimer, the term of this patent is extended or adjusted under 35 U.S.C. 154(b) by 131 days.

(21) Appl. No.: 11/536,195

(22) Filed: Sep. 28, 2006

(65) Prior Publication Data

US 2008/0080220 A1   Apr. 3, 2008

(51) Int. Cl.
H02H 7/122 (2006.01)
(52) U.S. Cl. .................. 363/56.03; 363/49; 363/56.04; 323/285; 323/901; 323/908
(58) Field of Classification Search ............. 315/209 R, 315/224–226, 291, 307, 308, DIG. 7; 323/284, 323/285, 901, 908; 363/49, 56.02–56.04, 363/79, 80, 98, 132
See application file for complete search history.

(56) References Cited

U.S. PATENT DOCUMENTS

| | | | |
|---|---|---|---|
| 6,545,432 B2 | 4/2003 | Konopka | |
| 6,822,401 B2 * | 11/2004 | Borella et al. | 315/291 |
| 6,930,454 B2 * | 8/2005 | Lott | 315/308 |
| 6,933,682 B2 * | 8/2005 | Ziegler | 315/224 |
| 2003/0025464 A1 * | 2/2003 | Konopka | 315/291 |

OTHER PUBLICATIONS

Related International Patent Application No. PCT/US07/19368, Search Report dated Apr. 10, 2008, 2 pgs.

* cited by examiner

*Primary Examiner*—Jessica Han
*Assistant Examiner*—Emily Pham
(74) *Attorney, Agent, or Firm*—Fitch, Even, Tabin & Flannery

(57) ABSTRACT

An inverter (100) comprises first and second input terminals (102,104), an inverter output terminal (106), a series arrangement of a first inverter transistor (110) and a second inverter transistor (120), a driver circuit (130), a primary current sensing circuit (150,154,156), and an auxiliary current sensing circuit (160). Primary current sensing circuit (150,154,156) is coupled between second inverter transistor (120) and a current-sense input (132) of driver circuit (130). Auxiliary current sensing circuit (160) is coupled between second inverter transistor (120) and a frequency control input (134) of driver circuit (130). During operation, if the current flow through inverter transistors (110,120) exceeds a predetermined peak limit, auxiliary current sensing circuit (160) provides an auxiliary signal to frequency control input (134) of driver circuit (130), thereby increasing a drive frequency at which driver circuit (130) commutates inverter transistors (110,120). The increase in the drive frequency reduces the peak current flow through inverter transistors (110,120), thereby protecting inverter transistors (110,120) from excessive power dissipation and potentially destructive heating.

14 Claims, 1 Drawing Sheet

US 7,489,531 B2

INVERTER WITH IMPROVED OVERCURRENT PROTECTION CIRCUIT, AND POWER SUPPLY AND ELECTRONIC BALLAST THEREFOR

FIELD OF THE INVENTION

The present invention relates to the general subjects of power supplies and ballast circuits for powering discharge lamps. More particularly, the present invention relates to an inverter that includes an improved overcurrent protection circuit, as well as to a power supply and an electronic ballast that includes such an inverter.

BACKGROUND OF THE INVENTION

Many power supplies and electronic ballast for gas discharge lamps employ bridge-type inverters. Bridge-type inverters include full-bridge inverters (which require four power switching devices) and half-bridge inverters (which require two power switching devices). The power switching devices are commonly realized by power transistors, such as bipolar junction transistors (BJTs) or field-effect transistors (FETs). Bridge-type inverters are generally classified into two groups—self-oscillating or driven—according to the approach that is used to provide commutation (i.e., switching on and off) of the power transistors.

Driven bridge-type inverters employ a dedicated driver circuit for commutating the inverter transistors, and typically include a current feedback arrangement (coupled between the inverter transistors and the driver circuit) to ensure that the peak current that flows through the inverter transistors during conduction is maintained within a reasonable limit. This is necessary in order to prevent excessive heating of the transistors (due to conduction power losses) and, more fundamentally, to ensure that the maximum current ratings of the transistors are not exceeded. In any case, the current feedback arrangement is required in order to preserve the long-term reliability of the inverter and to protect the inverter transistors from destruction.

A common current feedback arrangement employs a current sensing resistor (e.g., resistor 150 in FIG. 1) that is connected in series with one or more of the inverter transistors (e.g., transistor 120 in FIG. 1). The instantaneous voltage that appears across the current sensing resistor is proportional to the instantaneous current that flows through the inverter transistors during conduction. The voltage across the current sensing resistor is provided to a current-sense input (e.g., input 132 in FIG. 1) of the driver circuit (e.g., driver circuit 130 in FIG. 1) by way of an RC filtering network (e.g., resistor 154 and capacitor 156 in FIG. 1) that substantially prevents high frequency noise or other spurious signals from reaching the current-sense input of the driver circuit. During operation, the driver circuit continuously monitors the voltage at the current-sense input. If the voltage at the current sense input attempts to exceed a predetermined limit (e.g., about 0.6 volts or so, but sometimes variable based on mode of operation), the driver circuit modifies the nature of the drive signals (e.g., which are provided via drive outputs 140,144 in FIG. 1) for the inverter transistors (e.g., transistors 110,120 in FIG. 1) in such a way as to reduce the instantaneous current flow through the inverter transistors.

The aforementioned approach usually performs well under many types of operating conditions. However, it has been found that this approach does not effectively limit the instantaneous current flow through the inverter transistors under certain conditions, such as when the inverter operates in a so-called "capacitive switching" mode. For those applications in which an inverter drives a resonant output circuit (e.g., inductor 210 and capacitor 212 in FIG. 1), which is a common in arrangement in many types of electronic ballasts and in some types of power supplies, capacitive-mode switching tends to occur when the direct current (DC) input voltage supplied to the inverter (e.g., $V_{RAIL}$ in FIG. 1) falls significantly below its normal value (i.e., when $V_{RAIL}$ "falls out of regulation").

During capacitive-mode switching, the current that flows through the inverter transistors (during conduction) is generally characterized as having a high amplitude (i.e., a high peak value) and a short duration (i.e., a narrow pulse width). At the same time, the DC input voltage $V_{RAIL}$ has been significantly reduced (which is what gave rise to capacitive-mode switching in the first place). Under those conditions, during which the peak value of the current through the inverter switches may reach many multiples (e.g., 8 to 25 times) of its normal operating value, the conventional approach (i.e., utilizing a current sensing resistor and an RC filter coupled to the current-sense input of the driver circuit) does not effectively limit the peak value of the current through the inverter transistors. Consequently, the inverter transistors experience a level of power dissipation (and associated heating) that may cause the junction temperatures within the transistors to become so high that the transistors are destroyed.

Thus, a need exists for an inverter having a protection circuit that is capable of reliably protecting the inverter transistors from overcurrent conditions that occur during capacitive-mode operation. Such an inverter, as well as a power supply or an electronic ballast that includes such an inverter, would represent a considerable advance over the prior art.

DETAILED DESCRIPTION OF THE PREFERRED EMBODIMENTS

Figure 1:
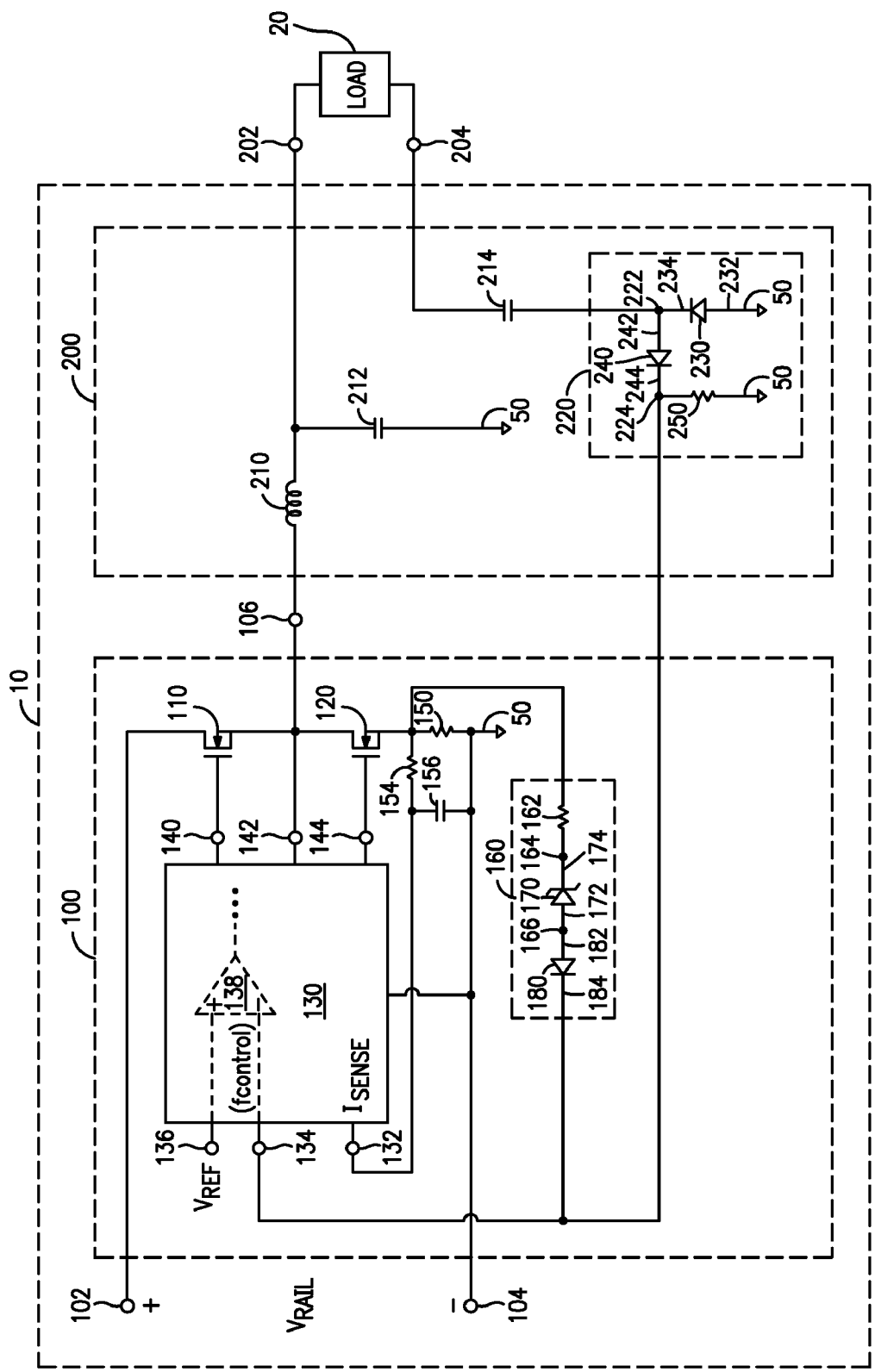
FIG. 1 is a circuit diagram of an arrangement including an inverter and output circuit, in which the inverter includes an improved overcurrent protection circuit, in accordance with a preferred embodiment of the present invention.

FIG. 1 describes a circuit 10 for powering a load 20. Circuit 10, which may be employed as the back-end portion of a power supply or of an electronic ballast for powering one or more gas discharge lamps, includes an inverter 100 and an output circuit 200.

Inverter 100 includes first and second input terminals 102, 104, an inverter output terminal 106, a series arrangement of a first inverter transistor 110 and a second inverter transistor 120, a driver circuit 130, a primary current sensing circuit 150,154,156, and an auxiliary current sensing circuit 160. As will be described in further detail herein, auxiliary current sensing circuit 160 functions to protect inverter transistors 110,120 from excessive power dissipation and possible destruction under conditions (e.g, capacitive-mode switching) for which the primary current sensing circuit does not suffice.

The detailed structure and operation of inverter 100 are now described with reference to FIG. 1 as follows.

First and second input terminals 102,104 are intended to receive a substantially direct current (DC) voltage source, $V_{RAIL}$. Commonly, $V_{RAIL}$ is provided by a combination of a rectifier circuit (which receives a conventional source of AC voltage, such 277 volts rms at 60 hertz) and a DC-to-DC converter (such as a boost converter). Second input terminal 104 is also coupled to circuit ground 50. Inverter output terminal 106 is coupled to an output circuit 200 which processes the output voltage of the inverter so as to provide a suitable source of power to a load 20.

The series arrangement of first inverter transistor 110 and second inverter transistor 120 is coupled between first and second input terminals 102,104. First inverter transistor 110 is coupled to second inverter transistor 120 at inverter output terminal 106. As described in FIG. 1, first and second inverter transistors 110,120 constitute a half-bridge arrangement; nevertheless, it should be appreciated that the principles of the present invention as described herein may also be applied to a full-bridge arrangement.

Driver circuit 130 is preferably realized by a suitable device, such as the L6570 integrated circuit manufactured by ST Microelectronics. Driver circuit 130 is coupled, via drive outputs 140,142,144, to first and second inverter transistors 110,120. During operation, driver circuit 130 commutates inverter transistors 110,120 in a substantially complementary manner (i.e., such that, when transistor 110 is on, transistor 120 is off, and vice-versa) and at a drive frequency; preferably, the drive frequency is selected to greater than about 20,000 hertz. Driver circuit 130 includes a number of other inputs that, for purposes of clearly illustrating the present invention, are not shown or described herein but that are within the knowledge of those skilled in the art. However, as relates to the present invention, driver circuit 130 includes a current-sense input 132 and a frequency control input 134. Driver circuit 130 also includes a reference voltage input 136 for receiving a predetermined reference voltage $V_{REF}$ (which is typically on the order of about 1 volt or less); inside of driver circuit 130, $V_{REF}$ is used by an operational amplifier 138 (depicted by phantom lines in FIG. 1) in logically processing the signal (fcontrol) that is supplied to frequency control input 134.

Primary current sensing circuit 150,154,156 is coupled between second inverter transistor 120 and current-sense input 132 of driver circuit 130. More specifically, the primary current sensing circuit includes a current-sensing resistor 150 and an RC filter comprising a resistor 154 and a capacitor 156. Current sensing resistor 150 is coupled between second inverter transistor 120 and circuit ground 50. Resistor 154 is coupled between the top of current-sensing resistor 150 and current-sense input ($I_{SENSE}$) 132 of driver circuit 130. Capacitor 156 in coupled between current-sense input 132 of driver circuit 130 and circuit ground 50. The basic operation of primary current sensing circuit 150,154,156 was previously described in the "Background of the Invention" discussion and is well known to those skilled in the art.

Significantly, and as previously discussed in the "Background of the Invention," when inverter 100 operates in capacitive switching mode (which occurs, for example, when $V_{RAIL}$ falls out of regulation), primary current sensing circuit 150,154,156, does not effectively limit the peak current through inverter transistors 110, 120.

Auxiliary current sensing circuit 160 is coupled between second inverter transistor 120 and frequency control input (fcontrol) 134 of driver circuit 130. During operation, when the current flow through inverter transistors 110,120 exceeds a predetermined peak limit, auxiliary current sensing circuit 160 activates and provides an auxiliary signal to frequency control input 134 of driver circuit 130. The effect of the auxiliary signal being provided to frequency control input 134 is to increase the drive frequency at which driver circuit 130 commutates inverter transistors 110,120, thereby reducing the peak current that flows through transistors 110,120.

Preferably, as described in FIG. 1, auxiliary current sensing circuit 160 includes a resistor 162, a voltage-breakdown device 170, and a diode 180. Resistor 162 is coupled between current-sensing resistor 150 and a first node 164. Voltage-breakdown device 170 is coupled between first node 164 and a second node 166. Diode 180 has an anode 182 coupled to second node 166, and a cathode 184 coupled to frequency control input 134 of driver circuit 130.

It is contemplated that voltage breakdown device 170 may be realized by any of a number of suitable components. Preferably, as depicted in FIG. 1, voltage breakdown device 170 is realized by a zener diode having a cathode 174 coupled to first node 164 and an anode 172 coupled to second node 166. Zener diode 170 is selected to have a zener breakdown voltage (e.g., 3.3 volts) that is low enough to provide compatibility with other circuitry (e.g., driver circuit 130) within inverter 100, but that is also high enough to ensure that auxiliary current sensing circuit 160 is not preemptively activated during the normal startup process of inverter 100. With regard to the latter point, it should be understood that initial operation of inverter 100 (i.e., what occurs shortly after power is applied to circuit 10) is typically accompanied by peak currents (through transistors 110,120) that are at least somewhat higher than the peak currents that occur during normal steady-state operation of inverter 100. A significant advantage of auxiliary current sensing circuit 160 is that it ordinarily does not activate during (and thus does not prevent, or otherwise interfere with) the normal startup process of inverter 100. This advantageous behavior is largely attributable to the deployment of voltage breakdown device 170, which is selected to have a breakdown voltage (e.g., 3.3 volts) that is high enough to avoid what might be termed "false detection" during inverter startup.

During operation, if the instantaneous current through inverter transistors 110,120 exceeds a predetermined peak limit, the voltage across current-sensing resistor 150 (which voltage is proportional to the current through the inverter transistors) will attempt to exceed a corresponding voltage threshold (e.g., about 3.9 volts or so, when zener diode 170 is chosen to have a zener voltage of 3.3 volt)) necessary for activating auxiliary current sensing circuit 160. Within auxiliary current sensing circuit 160, as the voltage across current-sensing resistor 150 approaches the voltage threshold (e.g., 3.9 volts), zener diode 170 will breakdown and become conductive, and diode 180 will become forward-biased and conductive; in other words, auxiliary current sensing circuit 160 will be activated, thereby providing a signal to frequency control input 134 of driver circuit 130. In this way, auxiliary current sensing circuit 160 responds to excessive peak currents through the inverter transistors and provides a signal by which driver circuit 130 responds (by appropriately modifying the drive to the inverter transistors) to protect the inverter transistors from potentially destructive heating.

Referring again to FIG. 1, a preferred realization of output circuit 200 that is particularly suitable for use in an electronic ballast (i.e., where load 20 includes one or more gas discharge lamps) is described in detail as follows.

Output circuit 200 preferably includes at least two output connections 202,204, a resonant circuit 210,212, a direct current (DC) blocking capacitor 214, and a load current monitoring circuit 220.

Output connections 202,204 are intended for connection to load 20. The resonant circuit includes a resonant inductor 210 and a resonant capacitor 212. Resonant inductor 210 is coupled between inverter output terminal 106 and first output connection 202. Resonant capacitor 212 is coupled between first output connection 202 and circuit ground 50. Load current monitoring circuit 220 is coupled to second output connection 204, circuit ground 50, and frequency control input 134 of driver circuit 130. Direct current (DC) blocking capacitor 214 is coupled between second output connection 204 and load current monitoring circuit 220. The purpose and operation of resonant inductor 210, resonant capacitor 212, and DC blocking capacitor 214 are well known to those skilled in the arts pertaining to power supplies and electronic ballasts.

During operation, load current monitoring circuit 220 monitors the AC current that flows through load 20 and provides a corresponding load-dependent signal to frequency control input 134 of driver circuit 130. Stated another way, load current monitoring circuit 220 provides a voltage to frequency control input 134 that is representative of the magnitude of the current flowing through load 20, thereby allowing driver circuit 130 to regulate the load current (i.e., to maintain the load current at a desired value).

As described in FIG. 1, load current monitoring circuit 220 preferably includes a second diode 230, a third diode 240, and a third resistor 250. Second diode 230 has an anode 232 coupled to circuit ground 50, and a cathode coupled to a third node 222. Third diode 240 has an anode 242 coupled to third node 222 and a cathode 244 coupled to a fourth node 224; fourth node 224 is coupled to frequency control input 134 of driver circuit 130. Resistor 250 is coupled between fourth node 224 and circuit ground 50. During operation, load current monitoring circuit 220 functions as a half-wave rectifier circuit wherein the positive half cycles of the load current are passed through, via diode 240, to resistor 250 to develop a corresponding positive voltage across resistor 250; the negative half cycles of the load current are allowed to flow through, via diode 230, to circuit ground 50 (and thus do not influence the voltage across resistor 250). Thus, load current monitoring circuit 220 provides a voltage to frequency control input 134 that is representative of the positive half cycles of the load current.

Referring again to FIG. 1, and based on the preceding discussion, it should be understood that frequency control input 134 generally receives two voltage signals—one from load current monitoring circuit 220, and one (but only under certain conditions, as previously described) from auxiliary current sensing circuit 160.

During normal operation of circuit 10, when the peak instantaneous current through the inverter transistors is within the specified peak limit, auxiliary current sensing circuit 160 is not activated (i.e., zener diode 170 is non-conductive), so no signal is provided to frequency control input 134 from auxiliary current sensing circuit 160. During those times, load current monitoring circuit 220 provides a voltage signal to frequency control input 134 that is representative of the load current and that is used by driver circuit 130 to regulate the load current.

Conversely, during certain operating modes (e.g., capacitive switching mode), when the peak instantaneous current through the inverter transistors attempts to exceed the specified peak limit auxiliary current sensing circuit 160 is activated (i.e., zener diode 170 and diode 180 become conductive), so a signal is provided to frequency control input 134 from auxiliary current sensing circuit 160. That signal is superimposed upon (i.e., added to) the signal provided by load current monitoring circuit 220.

Preferred components and/or component values for implementing primary current sensing circuit 150,154,156, auxiliary current sensing circuit 160, and load current monitoring circuit 220 are listed as follows:

Primary Current Sensing Circuit 150,154,156:
Resistor 150: 0.68 ohm, 5%, 1 watt
Resistor 154: 3.9 kilohm, 5%, 0.125 watt
Capacitor 156: 470 picofarad, 5%, 50 volt
Auxiliary Current Sensing Circuit 160:
Resistor 162: 220 ohm, 5%, 0.25 watt
Voltage breakdown device 170: 1N5226B (3.3 volt zener diode)
Diode 180: 1N4148
Load Current Monitoring Circuit 220:
Diodes 230,240: rated at 50 volts, 600 millamperes, 4 nanoseconds
Resistor 250: 1.1 ohm, 1%, 0.5 watt Although the present invention has been described with reference to certain preferred embodiments, numerous modifications and variations can be made by those skilled in the art without departing from the novel spirit and scope of this invention.

What is claimed is:

1. An inverter comprising:
first and second input terminals adapted to receive a substantially direct current (DC) voltage source;
an inverter output terminal:
a series arrangement of a first inverter transistor and a second inverter transistor, the series arrangement being coupled between the first and second input terminals, wherein the first inverter transistor is coupled to the second inverter transistor at the inverter output terminal;
a driver circuit coupled to the first and second inverter transistors and operable to commutate the inverter transistors in a substantially complementary manner and at a drive frequency, the driver circuit including a current-sense input and a frequency control input;
a primary current sensing circuit coupled between the second inverter transistor and the current-sense input of the driver circuit, comprising a current-sensing resistor coupled between the second inverter transistor and circuit ground, wherein circuit ground is coupled to the second input terminal; and
an auxiliary current sensing circuit, coupled between the second inverter transistor and the frequency control input of the driver circuit, wherein the auxiliary current sensing circuit is operable, in response to a condition wherein the current flow through the inverter transistors exceeds a predetermined peak limit, to provide an auxiliary signal to the frequency control input of the driver circuit, thereby increasing the drive frequency and reducing the current flow through the inverter transistors, comprising:
a resistor coupled between the current-sensing resistor and a first node;
a voltage-breakdown device coupled between the first node and a second node; and
a diode having an anode coupled to the second node and a cathode coupled to the frequency control input of the driver circuit.

2. The inverter of claim 1, wherein the voltage-breakdown device comprises a zener diode having a cathode coupled to the first node and an anode coupled to the second node.

3. The inverter of claim 2, wherein the zener diode has a zener breakdown voltage on the order of about 3.3 volts.

4. The inverter of claim 1, wherein the auxiliary current sensing circuit is further operable to allow startup of the inverter without providing the auxiliary signal to the frequency control input of the driver circuit.

5. A power supply for providing power to a load, comprising:
an inverter, comprising:
first and second input terminals adapted to receive a substantially direct current (DC) voltage source;
an inverter output terminal;
a series arrangement of a first inverter transistor and a second inverter transistor, the series arrangement being coupled between the first and second input terminals, wherein the first inverter transistor is coupled to the second inverter transistor at the inverter output terminal;
a driver circuit coupled to the first and second inverter transistors and operable to commutate the inverter transistors in a substantially complementary manner and at a drive frequency, the driver circuit including a current-sense input and a frequency control input;
a primary current sensing circuit coupled between the second inverter transistor and the current-sense input of the driver circuit, wherein the primary current sensing circuit comprises a current-sensing resistor coupled between the second inverter transistor and circuit ground, wherein circuit ground is coupled to the second input terminal; and
an auxiliary current sensing circuit coupled between the second inverter transistor and the frequency control input of the driver circuit, wherein the auxiliary current sensing circuit comprises:
a first resistor coupled between the current-sensing resistor and a first node;
a voltage-breakdown device coupled between the first node and a second node; and
a first diode having an anode coupled to the second node and a cathode coupled to the frequency control input of the driver circuit; and
an output circuit coupled to the inverter output terminal, comprising:
first and second output connections adapted for connection to the load; and
a load current monitoring circuit coupled to the second output connection, circuit ground, and the frequency control input of the driver circuit, the load current monitoring circuit being operable to provide a load-dependent signal to the frequency control input of the driver circuit.

6. The power supply of claim 5, wherein the voltage-breakdown device comprises a zener diode having a cathode coupled to the first node and an anode coupled to the second node.

7. The power supply of claim 6, wherein the zener diode has a zener breakdown voltage on the order of about 3.3 volts.

8. The power supply of claim 5, wherein the auxiliary current sensing circuit is further operable to allow startup of the inverter without providing the auxiliary signal to the frequency control input of the driver circuit.

9. The power supply of claim 5, wherein the load current monitoring circuit comprises:
a second diode having an anode coupled to circuit ground, and a cathode coupled to a third node;
a third diode having an anode coupled to the third node, and a cathode coupled to a fourth node, wherein the fourth node is coupled to the frequency control input of the driver circuit; and
a second resistor coupled between the fourth node and circuit ground.

10. The power supply of claim 5, wherein:
the load includes at least one gas discharge lamp; and
the output circuit further comprises:
a resonant circuit, comprising:
a resonant inductor coupled between the inverter output terminal and the first output connection; and
a resonant capacitor coupled between the first output connection and circuit ground; and
a direct current (DC) blocking capacitor coupled between the second output connection and the load current monitoring circuit.

11. An electronic ballast for powering at least one gas discharge lamp, the ballast comprising:
a bridge-type inverter, comprising:
first and second input terminals adapted to receive a substantially direct current (DC) voltage source;
an inverter output terminal;
a first inverter transistor coupled between the first input terminal and the inverter output terminal;
a second inverter transistor coupled between the inverter output terminal and circuit ground, wherein circuit ground is coupled to the second input terminal;
a driver circuit coupled to the first and second inverter transistors and operable to commutate the inverter transistors in a substantially complementary manner and at a drive frequency, the driver circuit including a current-sense input and a frequency control input;
a primary current sensing circuit coupled between the second inverter transistor and the current-sense input of the driver circuit, wherein the primary current sensing circuit comprises a current-sensing resistor coupled between the second inverter transistor and circuit ground; and
an auxiliary current sensing circuit coupled between the second inverter transistor and the frequency control input of the driver circuit, wherein the auxiliary current sensing circuit comprises:
a first resistor coupled between the current-sensing resistor and a first node;
a zener diode having a cathode coupled to the first node and an anode coupled to a second node; and
a first diode having an anode coupled to the second node and a cathode coupled to the frequency control input of the driver circuit;
an output circuit coupled to the inverter output terminal, the output circuit comprising:
first and second output connections adapted for connection to the load;
a resonant circuit, comprising:
a resonant inductor coupled between the inverter output terminal and the first output connection; and
a resonant capacitor coupled between the first output connection and circuit ground;
a direct current (DC) blocking capacitor coupled to the second output connection; and
a load current monitoring circuit coupled to the DC blocking capacitor, circuit ground, and the frequency control input of the driver circuit, the load current monitoring circuit being operable to provide a load-dependent signal to the frequency control input of the driver circuit.

12. The electronic ballast of claim 11, wherein the zener diode has a zener breakdown voltage on the order of about 3.3 volts.

13. The electronic ballast of claim 11, wherein the load current monitoring circuit comprises:

a second diode having an anode coupled to circuit ground, and a cathode coupled to a third node;

a third diode having an anode coupled to the third node, and a cathode coupled to a fourth node, wherein the fourth node is coupled to the frequency control input of the driver circuit; and a second resistor coupled between the fourth node and circuit ground.

14. The electronic ballast of claim 11, wherein the auxiliary current sensing circuit is further operable to allow startup of the inverter without providing the auxiliary signal to the frequency control input of the driver circuit.

* * * * *